United States Patent
Lee

(10) Patent No.: US 6,279,800 B1
(45) Date of Patent: Aug. 28, 2001

(54) MULTIFUNCTIONAL TRAY FOR MOTOR VEHICLES

(76) Inventor: Ming-Chi Lee, 5F, No 2, Chien-Kang Rd., ChungHo, Taipei (TW)

(*) Notice: Subject to any disclaimer, the term of this patent is extended or adjusted under 35 U.S.C. 154(b) by 0 days.

(21) Appl. No.: 09/532,741

(22) Filed: Mar. 22, 2000

(30) Foreign Application Priority Data

May 28, 1999 (TW) ................................................ 88208625

(51) Int. Cl.⁷ ................................................ B60R 7/00
(52) U.S. Cl. .................. 224/276; 224/275; 108/44; 248/455; 248/462
(58) Field of Search .................. 224/275, 276, 224/482; 108/44; 248/454, 455, 456, 460, 462

(56) References Cited

U.S. PATENT DOCUMENTS

| | | | |
|---|---|---|---|
| 1,883,714 | * 10/1932 | Gray | 312/233 |
| 2,211,962 | * 8/1940 | Morris | 224/400 |
| 4,139,217 | * 2/1979 | Jamison | 281/43 |
| 4,453,788 | * 6/1984 | Russell | 312/231 |
| 4,858,796 | * 8/1989 | Roth | 224/482 |
| 6,038,983 | * 3/2000 | Lendl | 108/44 |

FOREIGN PATENT DOCUMENTS

0123456-A2 * 1/2000 (EP) ...................................... 100/100

* cited by examiner

Primary Examiner—Stephen K. Cronin
(74) Attorney, Agent, or Firm—Dougherty & Troxell

(57) ABSTRACT

A multifunctional tray for motor vehicles including a main bracket, a hook, a movable anchor bushing, a tray and a supporting member. The supporting member is extendable. The tray may be hung on the steering wheel or the backrest of a front seat and may be adjusted to different height and angle desired through adjusting the anchor bushing and the supporting member. Users may use the tray for meal, writing or doing other work desired.

3 Claims, 4 Drawing Sheets

MULTIFUNCTIONAL TRAY FOR MOTOR VEHICLES

BACKGROUND OF THE INVENTION

1. Field of the Invention

This invention relates to a multifunctional tray for motor vehicles and particularly to a multifunctional tray that has adjustable angle and height for use in motor vehicles.

2. Description of the Prior Art

Motor vehicles are widely used transportation means in daily life of most people either for work or leisure activities. Traffic congestion is a frequently encountered experience to many people driving or riding motor vehicles. In order to better use time when the vehicles are stuck on the road, drivers and passengers often try to do something in the vehicles, such as eating, drinking, reading, writing, do some work on a portable computer and the like. In order to serve such needs, movable trays for use inside the vehicle have been introduced in the market place. FIG. 1 shows one of the examples. It includes a main bracket A, a pair of hooks B each has a slit sleeve F engageable with the main bracket A, a pair of anchor bushings C movable along the main bracket A, a tray D having a pair of shafts H at one side thereof pivotally engageable with a pair of grooves G located on the anchor bushings C, and a supporting member E which has a through opening J at one end pivotally engaged with the main bracket A and a shaft rest K at another end thereof. Under the tray D, a shaft head I is provided. When in used the hooks B may be hung on the steering wheel or on the backrest of the front seat (as shown in FIG. 2). The supporting member E may be pulled out to have its shaft rest K engaged with the shaft head I under the tray D. The tray D then may be extended horizontally for use. However due to the fixed length of the supporting member E, the anchor bushing C cannot be moved up or down freely to suit users' need while still keeping the tray D horizontally positioned. It causes a lot of problems and troubles such as making users' eyes and body fatigue easily.

SUMMARY OF THE INVENTION

In view of aforesaid disadvantages, it is therefore an object of this invention to provide a multifinciotnal tray for motor vehicles that may be freely adjusted to a height and angle desired so that it may suit to different people for different uses desired.

In one aspect of this invention, the tray according to this invention includes a main bracket, a hook, a movable anchor bushing, a tray and a supporting means. The supporting means may be adjusted to different length so that the tray may be moved up or down at different height but the tray surface may still be kept horizontal to make users comfortable and convenient when in use.

BRIEF DESCRIPTION OF THE DRAWINGS

The invention, as well as its many advantages, may be further understood by the following detailed description and drawings in which.

DETAILED DESCRIPTION OF THE PREFERRED EMBODIMENT

Figure 1:
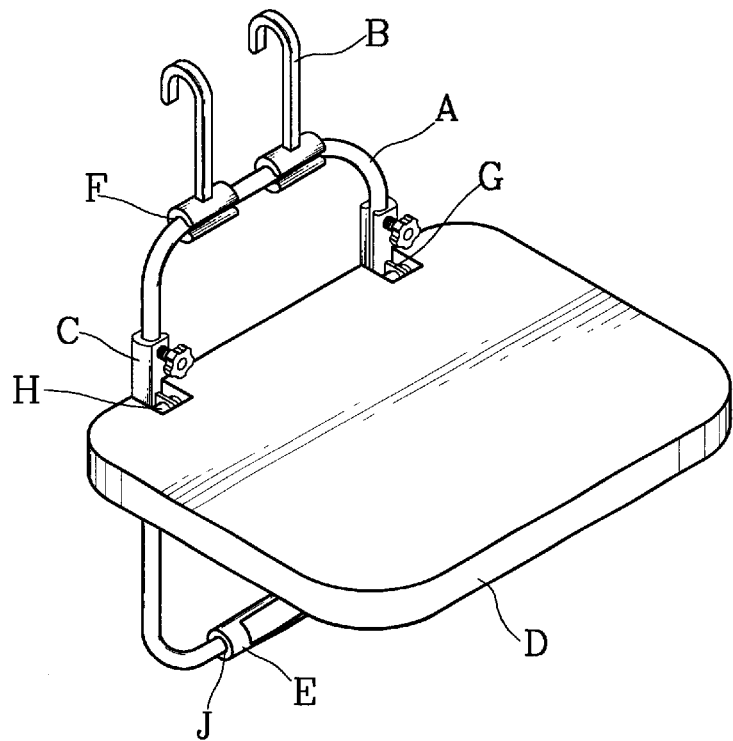
FIG. 1 is a pictorial view of a conventional tray for motor vehicles.
Figure 2:
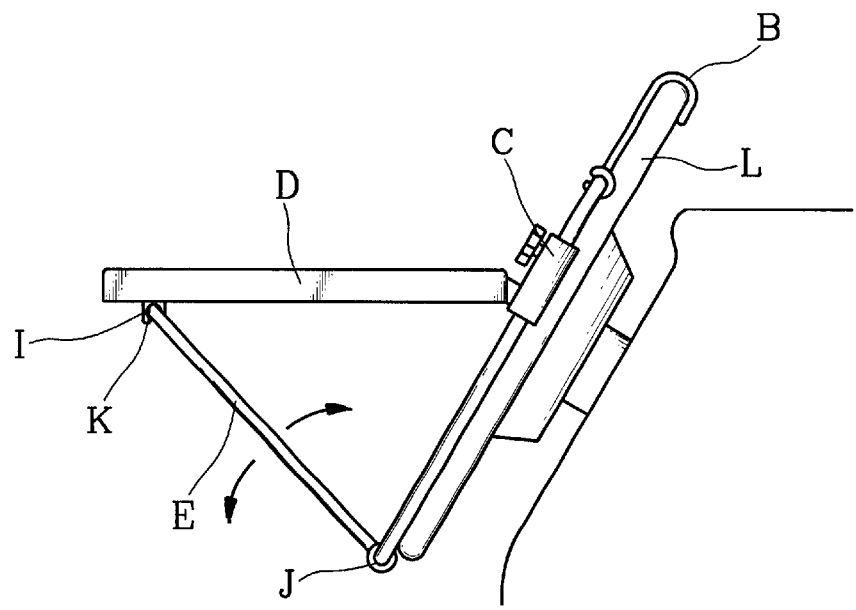
FIG. 2 is a side view of the tray shown in FIG. 1.
Figure 3:
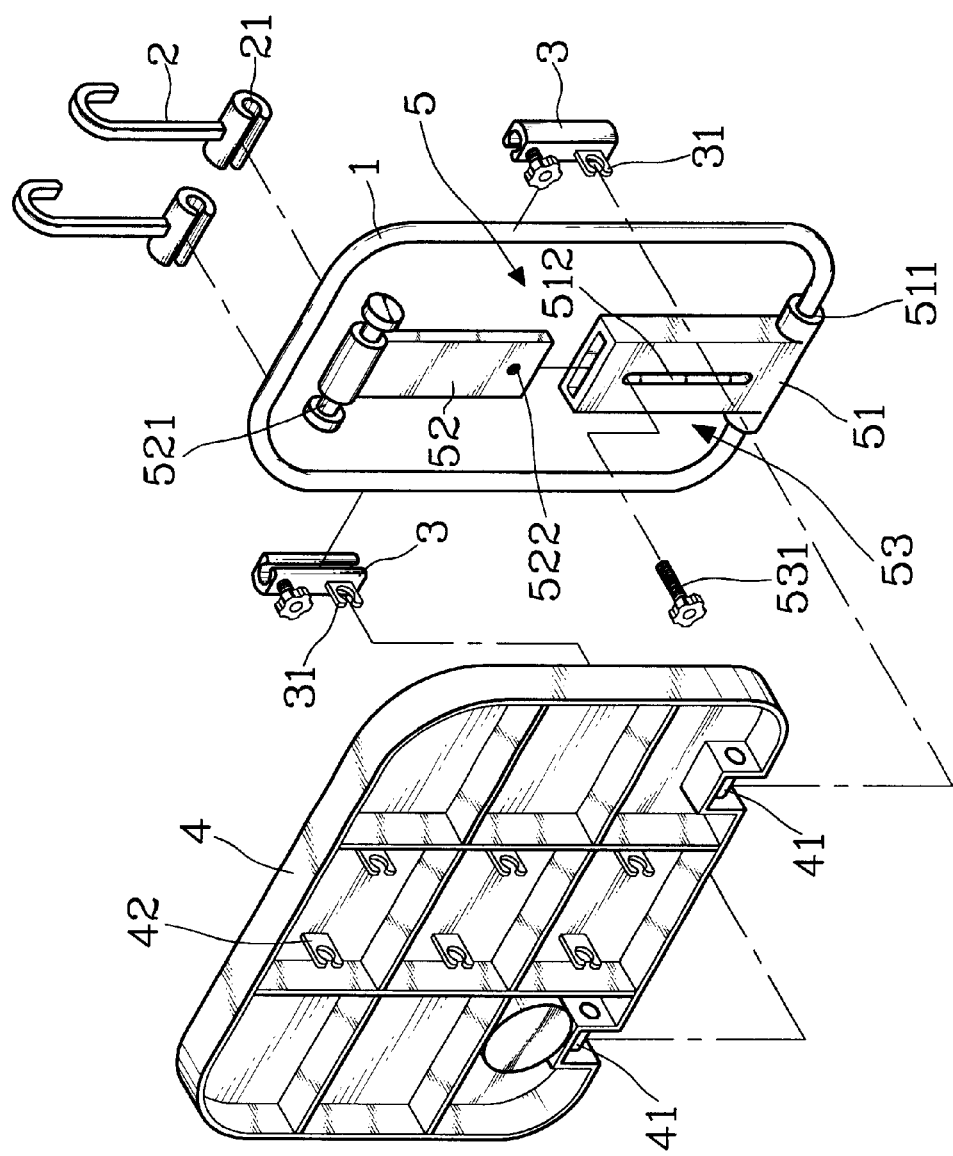
FIG. 3 is an exploded view of this invention.
Figure 4:
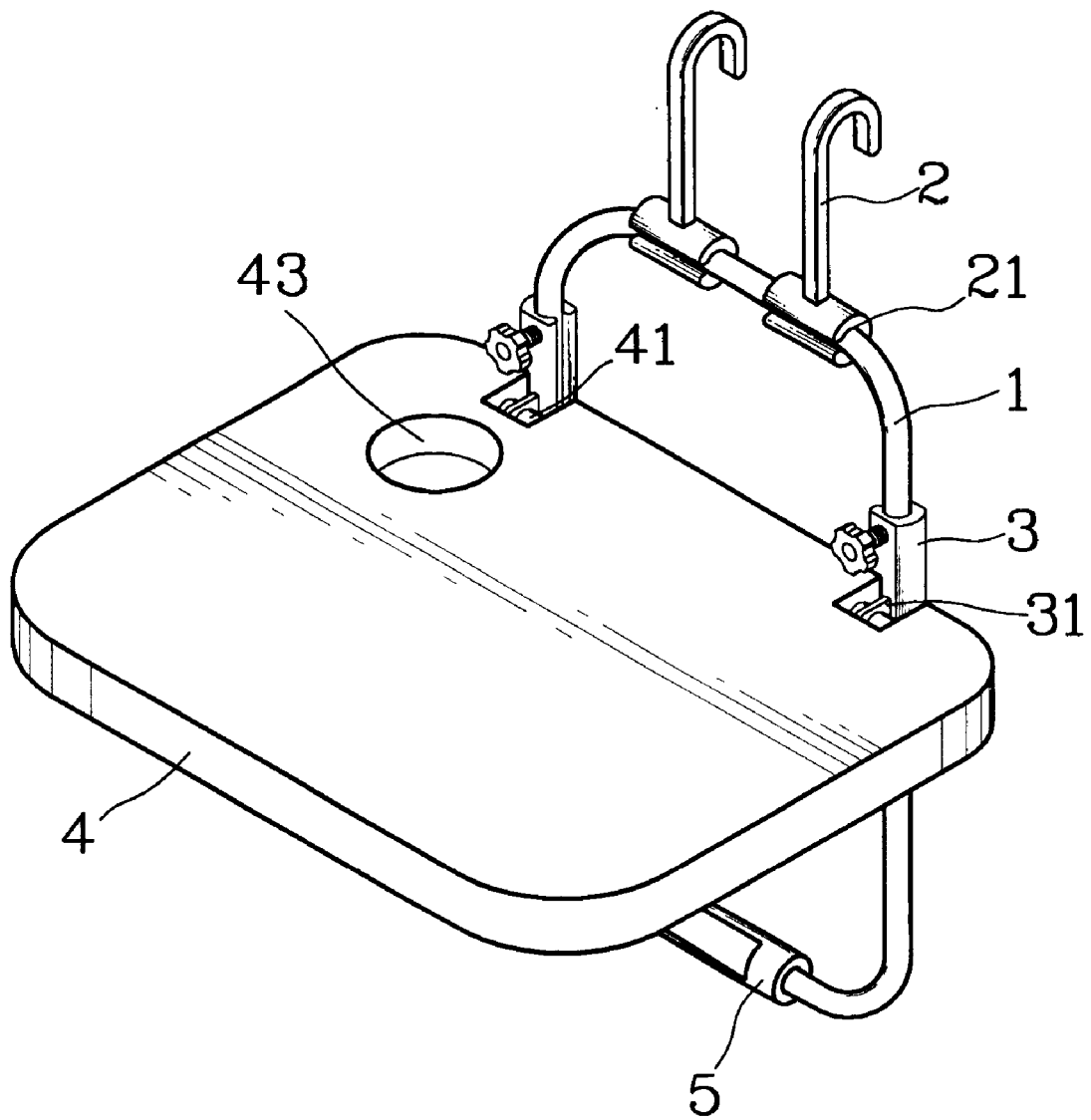
FIG. 4 is a perspective view of this invention.

Referring to FIGS. 3 and 4, the tray according to this invention includes a main bracket 1, a pair of hooks 2 each having a slit sleeve 21 engageable with the main bracket 1, a pair of anchor bushings 3 each having a groove 31 located at one side thereof and may be fixed on or movable along the main bracket 1, a tray 4 having a pair of shafts 41 at one side thereof pivotally engageable with the grooves 31 of the anchor bushings 3, and a supporting means 5. The tray 4 has a plurality of shaft rests 42 located under a bottom surface thereof.

The supporting means 5 includes a hollow frame 51 which has a through opening 511 at one end pivotally engageable with the main bracket 1, a slot opening at another end thereof and a longitudinal slot 512 in a lateral wall, a sliding block 52 movable in the hollow frame 51 through the slot opening and having a shaft arm 521 at one end and a screw bore 522 at another end thereof, and a fixing means 53 which may include a screw 531 enagageable with the screw bore 522 through the slot 512 for fixing the sliding block 52 in the hollow frame 51 at a location desired.

Figure 5:
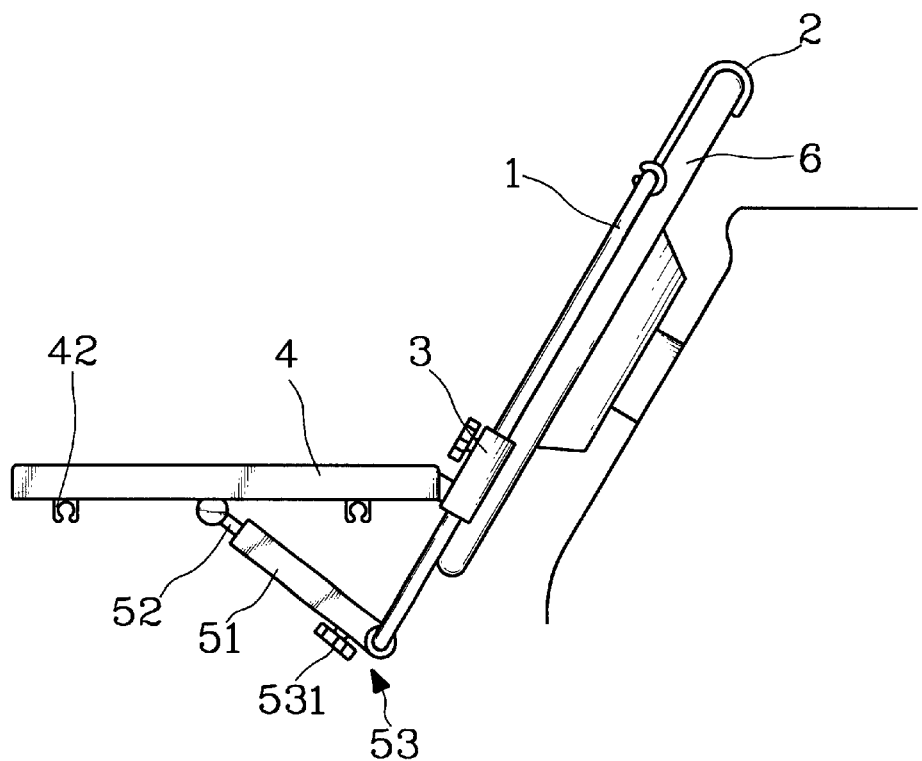
FIG. 5 is a side view of this invention in use.
Figure 5:
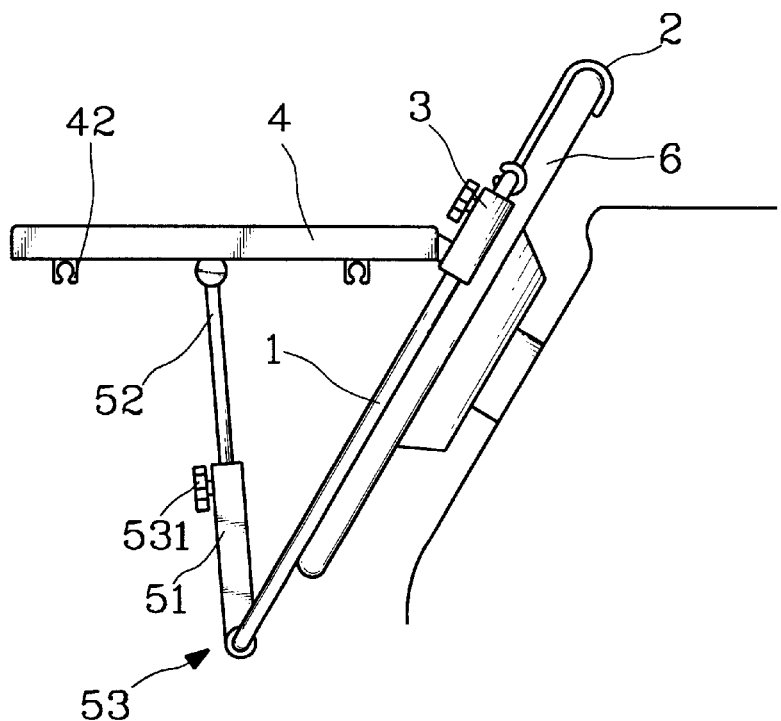

Referring to FIGS. 5A and 5B, when this invention in use, the hooks 2 are hung on the steering wheel 6 or the back rest of a front seat of a vehicle. One side of the tray 4 is pivotally engaged with the anchor bushings 3 through the shafts 41 and the grooves 31.

The supporting means 5 has one end pivotally engaged with the main bracket 1 through the through opening 511 and has another end engaging with one of the shaft rests 42 through the shaft arm 521. The anchor bushing 3 is moved and fixed on the main bracket 1 at a location desired. The top surface of the tray 4 is kept horizontal or other angle desired by moving the sliding block 52 in the hollow frame 51 then turning the screw 531 to tightly engage the sliding block 52 with the hollow frame 5 1.

When there is a need to move the tray 4 to a different height or different angle, the anchor bushing 3 may be moved up or down along the main bracket 1. Then turning the screw 531 to disengage the sliding block 52 with the hollow frame 51. The sliding block 52 may be moved inward or outward in the hollow frame 51 until the tray 4 reaches a position and angle desired. Then the screw 531 may be turned to engage the sliding block 52 with the hollow frame 51 again. The shaft arm 521 may also be engaged with the shaft rest 42 at different location to enable the tray 4 get a position or angle desired.

The tray 4 may also include other features such as an opening 43 or groove to enhance its utilization.

Through the structure set forth above, the tray of this invention may be easily and conveniently adapted to use in the vehicles regardless of the position or angle of the steering wheel or front seat. This invention also may be used equally well for different size of the users. The utilization of the tray may be greatly expanded such as holding food and drink, reading, writing, playing game, using portable computer and the like. Users may also use this invention for a long time period with less fatigue or injury.

It may thus be seen that the objects of the present invention set forth herein, as well as those made apparent from the forgoing description, are efficiently attained. While the preferred embodiments of the invention has been set forth for purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A multifunctional tray for motor vehicles, comprising;

a main bracket;

a hook having a slit sleeve at one end engageable with the main bracket;

an anchor bushing fixable and movable on the main bracket having a groove located thereof;

a tray having a shaft at one end thereof pivotally engageable with the groove and a shaft rest located thereunder; and a supporting member including a hollow frame which has a through opening at one end pivotally engageable with the main bracket and a slot opening at another end thereof, a sliding block movable in the hollow frame through the slot opening having a shaft arm at one end thereof engageable with the shaft rest and a fixing mean for fixing the sliding block on the hollow frame at a desired location.

2. The multifunctional tray of claim 1, wherein the hollow frame further has a slot in a lateral side, the sliding block having a screw bore facing the slot, and the fixing means including a screw engageable with the screw bore through the slot for fixing the sliding block on the hollow frame.

3. The multifunctional tray of claim 1, wherein the tray has a plurality of grooves formed therein.

* * * * *